United States Patent [19]
Sizer, II et al.

[11] Patent Number: 5,727,052
[45] Date of Patent: *Mar. 10, 1998

[54] SYSTEM AND APPARATUS FOR RECORDING AND DISPLAYING RECEIVED INFORMATION AT A REMOTE LOCATION USING PREMISES RECORDING UNIT

[75] Inventors: Theodore Sizer, II, Little Silver; Gregory Alan Wright, Colts Neck, both of N.J.

[73] Assignee: Lucent Tecnologies, Inc., Murray Hill, N.J.

[ * ] Notice: The term of this patent shall not extend beyond the expiration date of Pat. No. 5,606,603.

[21] Appl. No.: 596,814

[22] Filed: Feb. 5, 1996

Related U.S. Application Data

[63] Continuation of Ser. No. 369,064, Jan. 5, 1995.

[51] Int. Cl.$^6$ .......................... H04M 15/00; H04M 15/06
[52] U.S. Cl. .......................... 379/142; 379/127; 379/130; 379/136
[58] Field of Search ...................... 379/56, 57, 96, 379/102, 105, 127, 130, 142, 245, 246, 376, 136, 93.17, 93.16, 93.23, 102.01, 102.02; 348/10, 12, 13, 14, 17; 340/311.1, 330, 539; 455/11.1, 31.2, 31.3, 4.1, 4.2

[56] References Cited

U.S. PATENT DOCUMENTS

| | | | |
|---|---|---|---|
| 4,172,969 | 10/1979 | Levine et al. | 179/2 |
| 4,197,526 | 4/1980 | Levine et al. | 340/311 |
| 4,821,308 | 4/1989 | Hashimoto | 379/57 |
| 4,961,216 | 10/1990 | Baehr et al. | 379/57 |
| 5,054,055 | 10/1991 | Hanle et al. | 379/376 |
| 5,228,073 | 7/1993 | Smith | 379/396 |
| 5,274,699 | 12/1993 | Ranz | 379/142 |
| 5,349,638 | 9/1994 | Pitroda | 379/142 |

*Primary Examiner*—Curtis Kuntz
*Assistant Examiner*—Vijay Shankar
*Attorney, Agent, or Firm*—Morgan & Finnegan LLP

[57] ABSTRACT

An system and apparatus records and displays information received from a premises such as ambient temperature or information received over a telephone network. A premises recording unit is connected to a telephone network and receives and stores telephone information received therefrom. The premises recording unit includes a wireless transmitter for generating and transmitting a packet of telephone information received from the telephone network. The generated signals can be radio, infrared and ultrasonic. A packet receiver is spaced distant from the premises recording unit but within range of the packet transmission generated therefrom for receiving and storing the packet of telephone information. The packet receiver displays at least a portion of the packet of information.

16 Claims, 6 Drawing Sheets

SYSTEM AND APPARATUS FOR RECORDING AND DISPLAYING RECEIVED INFORMATION AT A REMOTE LOCATION USING PREMISES RECORDING UNIT

This is a continuation of co-pending application Ser. No. 08/369,064 filed Jan. 5, 1995.

This application is related to copending application entitled "System and Apparatus For Recording and Displaying Received Information at a Remote Location," filed on the same date hereof by the same inventors.

FIELD OF THE INVENTION

This application relates to a system and apparatus for recording and displaying information, such as a telephone message received over a telephone network, at a remote location such as the entrance to an office or home.

BACKGROUND OF THE INVENTION

Most ordinary answering machines are limited in function. They record a message and play it back at a later date. The advent of more sophisticated telephone network services in buildings and in the general population, as well as more sophisticated cable and telephone systems, allows greater potential for recording information, telephone messages and prompts transmitted into a recording unit from a communication channel operatively connected to a telephone network or cable system.

The increase in computerized telephone equipment has led to an increase in sophisticated services offerings such as caller identification, video data, billing and credit information, interactive multimedia and networking among computers and other networks. This has increased the time demands on many individuals. These users typically require or desire instant access to telephone information such as caller identification, the time of the call and other pertinent details in a quick, readable format and an easily accessible location. For example, a busy business traveler may desire instant access to this information as he enters his home or office. By enabling him to obtain the most pertinent information, the busy traveler can then quickly know what important emergency calls have to be made without having to go through a complicated or time intensive use of an answering machine or premises recording unit.

It would be desirable if the sophisticated information now available such as caller identification, time of call, video data, billing and credit information, interactive multimedia and other data could be recorded from a telephone network onto a premises recording unit, while also allowing easy access to the more pertinent of this information at a remote location such as an office or residence entrance. This pertinent information could include the identification of the caller, the time of the call, what messages were left, and other information such as whether a fax was sent. This display of pertinent information at a remote location such as an office entrance is advantageous especially if the business traveler were gone for an extended period of time, and a half hour to an hour of messages were stored on a central premises recording unit. Thus, the business traveler could bypass the use of the central premises recording unit until he had finished the more pressing matters that were noted on a display at a remote location, such as the doorway entrance to the office.

It would also be advantageous if information from the premises itself, such as temperature, could be transmitted to a display at a remote location, such as an entrance door. Such a system could bypass use of a premises recording unit. Also, it would be advantageous if caller ID information could be displayed at a remote premises location, such as the entrance door, without use of a premises recording unit.

SUMMARY OF THE INVENTION

The present invention overcomes the disadvantages of using a central premises recording unit to obtain immediate information such as when business travelers initially return to their offices and desire this information as soon as they enter the doorway. In accordance with the present invention, the system records information, such as temperature, received from a premises, and transmits this information to a remote premises location, such as a packet receiver positioned at the door entrance. The transmission is typically a packet of information transmitted by radio, infrared or ultrasound. The transmitter can be connected to a telephone network for receiving and transmitting caller ID information.

In one aspect of the invention, the system includes a premises recording unit which stores telephone information received from a telephone network. The premises recording unit is connected to the telephone network and further includes a radio transmitter for generating and transmitting a packet of telephone information received from the telephone network. A packet receiver is spaced distant from the premises recording unit but within range of the packet transmission generated therefrom for receiving and storing the packet of telephone information. The packet receiver includes a display for displaying at least a portion of the packet of information. The packet contains an address and data.

A premises recording unit includes a means for extracting the caller ID from an incoming telephone message and transmitting same to the packet receiver. The packet receiver has a display which is able to display the caller ID information such as a liquid crystal display (LCD) or light emitting diode (LED).

The premises recording unit also includes an interface connector for interfacing with a video display for displaying the stored information. The premises recording unit is also responsive to the signals received from a wireless premises control unit for retrieving the stored information and displaying same on the video display. The premises recording unit can include an infrared sensor or radio receiver. A premises control unit generates an infrared or radio control signal to the sensing unit or radio receiver for enabling control of the premises recording unit via the transmitted control signals. A cable set top box can be operatively connected to a cable communication channel and the premises recording unit. The premises recording unit includes a controller for routing information to the video display interface as received from the cable communication channel.

The packet receiver can include a means for inputting information and means for transmitting the inputted information back to the premises recording unit. This information could be information which signals the premises recording unit to start the video display such as a television, to begin playback of messages so that as the busy traveler enters his office, the messages will start displaying immediately. The signals can also request transmission of further information. The means for inputting information at the packet receiver can be a manual keypad positioned on the packet receiver and can generate signals back to the premises recording unit via an infrared or radio signal.

The premises recording unit further includes a microprocessor and a memory for storing information received over the telephone network. A bus is operatively connected to the premises recording unit and at least one cartridge slot is interconnected to the bus for receiving cartridges. In one aspect of the present invention, a cartridge is positioned within the cartridge slot and the cartridge positioned therein includes a radio transmitter for generating and transmitting a packet of the telephone information received from the telephone network.

DESCRIPTION OF THE DRAWINGS

The foregoing and other features and advantages of the present invention will be appreciated more fully from the following description, with reference to the accompanying drawings in which.

DETAILED DESCRIPTION OF THE INVENTION

Figure 1:
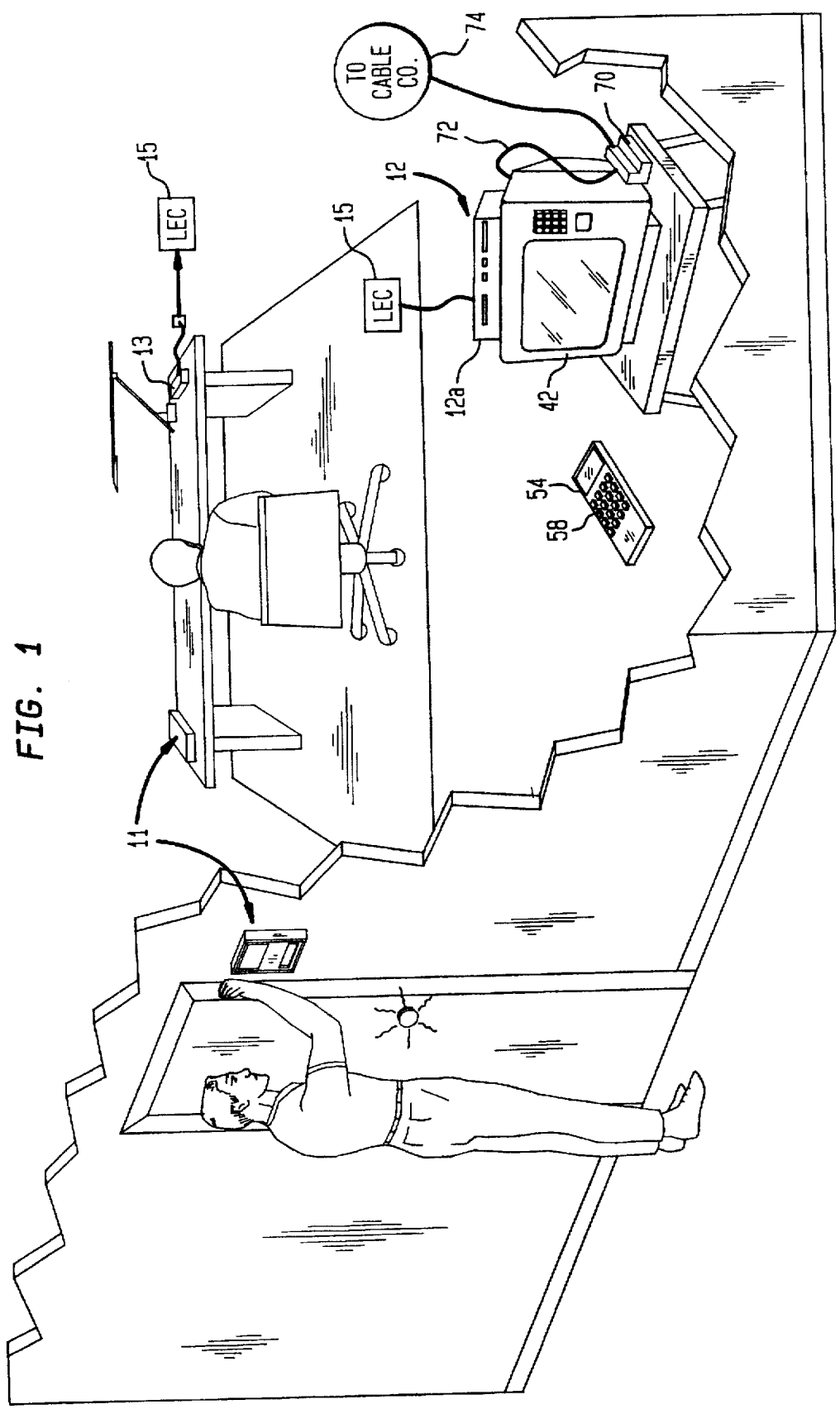
FIG. 1 is an environmental view of the system and apparatus of the present invention and shows a user preparing to enter his office and using the packet receiver to obtain pertinent information from the premises recording unit positioned on the television in the office.

Referring now to FIG. 1, there is illustrated generally at 10 a system of the present invention for recording and displaying information received over a telephone network and transmitting that information to a packet receiver, indicated generally at 11, positioned at the door entrance to a home or office, shown environmentally in FIG. 1. A busy business traveler or residential homeowner entering the premises can quickly glance at the display 11a, which can also be scrolled to look at the most pertinent details and messages left on a premises recording unit, indicated generally at 12. For purposes of clarity, the system is initially described when used with a premises recording unit 12. However, a premises recording unit is not always desirable, and information, such as temperature or caller ID received from the telephone network can be transmitted to the packet receiver 11 without the necessity of a recording unit. The transmitter, shown in FIG. 1 and indicated generally at 13, is not a recording unit, but connects directly to the telephone system. It can be placed on a desk as illustrated in FIG. 1.

Figure 2:
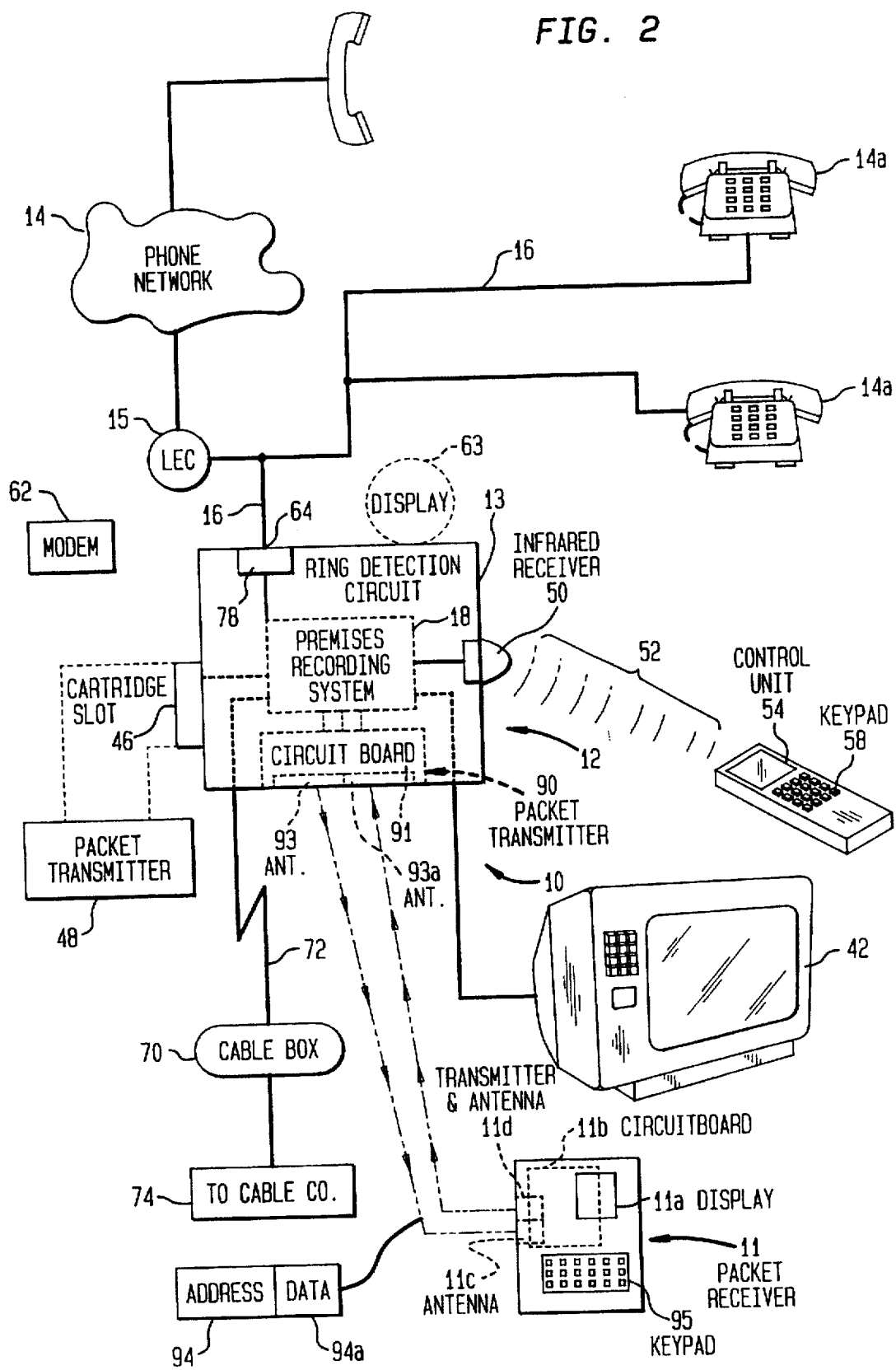
FIG. 2 is a schematic environmental view of the system and apparatus of the present invention that records and displays information received over a telephone network at a remote location.

The premises recording unit 12 includes a housing 12a enclosing the unit 12, which is connected to an information source such as a telephone network 14 which includes a local office 15, such as by standard telephone connectors. The unit 12 also connects to premises phone 14a (FIG. 2). Although the illustrated embodiment shows an outside telephone network, one skilled in the art will realize that the network could be a local or wide area network of various types, including a telephone network. The premises recording unit 12 is connected to a first communication channel 16, which could be twisted wire pair or other communication system known to those skilled in the art.

Figure 3:
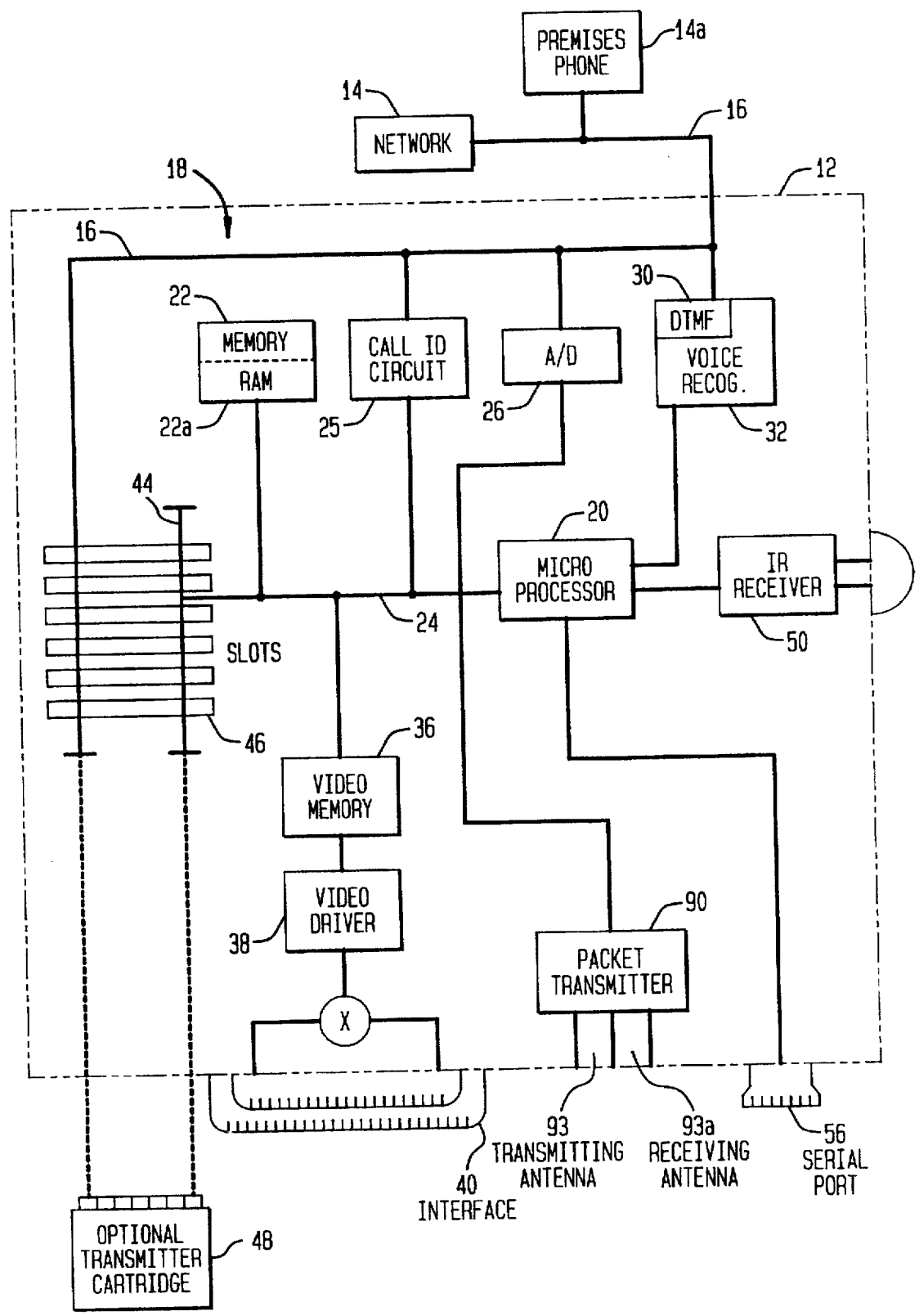
FIG. 3 is a high level block diagram of the premises recording unit of the present invention.

As shown in FIGS. 2 and 3, a premises recording system, indicated generally at 18, is mounted within the housing for recording information, telephone messages and prompts are saved along the first communication channel 16.

As shown in greater detail in FIG. 3, the premises recording system 18 further includes a microprocessor 20, and a memory 22, which stores information, telephone messages and prompts received along the first communication channel 16. The microprocessor 20 and memory 22 are connected along a digital bus 24. The memory can be RAM 22a or other known memory devices.

The premises recording system 18 also includes a caller identification circuit 25 for identifying a caller such as by the caller ID codes now a part of many network calls. The caller identification circuit 25 is connected to the first communication channel 16, also called the incoming line. An analog-to-digital convertor 26 is connected along the digital bus and first communication channel 16 to receive analog signals transmitted along that incoming line. The analog signals are converted to digital signals, which then can be stored in memory 22 and processed by the microprocessor 20. A dual tone multi-frequency detection circuit 30 is also a part of the premises recording system 18 as well as voice recognition circuitry 32 for responding to voice commands. Both circuits 30, 32 connect to the microprocessor 20 and the first communication channel 16. A video memory circuit 36 and video driver circuit 38 are connected to the digital bus. A standard video interface connector 40 is mounted on the housing and connected to circuits 36, 38 to interface with a video display such as the television set 42 for displaying stored information, telephone messages and prompts (FIG. 1).

The digital bus 24 also includes an expansion bus 44. Cartridge slots 46 are formed in the housing 12 and can receive cartridges 48 for interconnecting with the expansion bus 44 and expanding the various functions of the premises recording unit 10. As will be explained in further detail below, one cartridge could include a packet radio transmitter for generating packet signals to the packet receiver 11.

The premises recording unit 10 includes an infrared receiver 50 operatively connected to the microprocessor 20 and the digital bus 24 for receiving infrared control signals 52 generated from a source such as a premises control unit 54 (FIG. 2). The premises recording system 18 is responsive to infrared control signals 52 so that stored information, telephone messages and prompts can be retrieved and displayed on the video display such as the television set 42. Alternately, the receiver 50 could be a radio receiver which receives radio control signals.

In one preferred aspect of the present invention, the premises control unit 54 is an infrared generator that generates a sequence of infrared control signals along a second communication channel defined in the air space of a premises to the infrared receiver 50. These signals could be bounced off a light colored ceiling, such as found in many homes. In an alternate embodiment, the control unit 54 generates radio control signals. In another aspect of the present invention, the premises control unit 54 is a hand held remote control that can include a key pad 58 for inputting desired functions that correspond to a desired sequence of operations by the premises recording unit (FIG. 2). A standard, universal remote may also be used with some functions. The use of a universal remote, however, will depend on the desired functions required in the premises recording unit.

A serial port 56 can be also connected to the microprocessor so that an external modem or other serial device can be connected thereto (FIG. 3). The serial port 58 can accommodate a separate controller, modem, or other device.

In one aspect of the present invention as shown in FIG. 2, a modem cartridge 62 can be inserted within the cartridge slot 46 and operatively connected to the digital bus 24 via the expansion bus 44. In another aspect of the present invention, a display, shown by dotted lines at 63, can be mounted directly on the premises recording unit. A premises phone (not shown) can be connected to the premises recording unit through a standard phone connection 64.

As illustrated in FIG. 1, a cable set top box 70 is operatively connected to an incoming cable line 72 from a cable company 74 and the premises recording unit 10. The cable loops through the unit 10 to the television 42. Because the premises recording system 18 also includes a microprocessor 20, memory 22, and expandable bus 24, additional hardware or programming software can be added so that the unit 10 can receive, store and process information received from the cable. This can be advantageous if telephone systems and cable systems merge into one communication system.

Additionally, the premises recording system 18 may include a ring detection circuit 78 (FIG. 2) which registers the number of rings made by a premises phone. After a predetermined number of unanswered rings, the call is answered by the unit 10. The call is then routed to the unit 10, which can play a prerecorded message. The caller then can follow announcements and prompts to retrieve messages or leave other messages, or download information such as digital data. Also, any recorded messages could be played through the television 42.

Also, the unit 10 can be controlled by a selected DTMF sequence from a network phone, such as an outside caller. The unit 10 can be programmed to give prerecorded answers. An additional memory system (not shown) could provide prerecorded responses, such as prompts, for instructing the caller of how to respond to retrieve messages in or out of the home.

The unit 10 also can be programmed to give visual prompting to a user by means of the interface with the television. The use of cartridges also ensures "plug and play" simplicity, making operation and use of the unit 10 simple. No additional wiring is necessary with the present unit. Additional RAM can provide additional "fast" storage for file storage.

The unit 10 can also receive JPEG files which are compressed still images. An additional cartridge can hold JPEG Fax software to generate menus and allow color display on the TV using the internal video RAM. JPEG files reside in FAX/Modem memory, premises control unit memory, or on a disk. A modem can also transfer color images for displaying on the television or other display. The remote control keypad 58 can be more complicated, and include various other structure and functions, such as a full alphanumeric keypad, scratchpad or trackball (not shown). Additionally, the unit 10 can be programmed to conduct banking, or other services so that financial data can be downloaded to the unit 10.

The premises recording system 18 in accordance with the present invention includes a packet radio transmitter 90 for receiving information concerning a call and generating and transmitting a packet of the information to the packet receiver 11. The packet radio transmitter, indicated generally at 90 can be positioned on a circuit board, indicated by the dotted lines at 91, and operatively connected to the internal bus 24, thus forming an integral part of the bus and premises recording system. Additionally, the packet transmitter can be formed on a cartridge 48 and inserted within a slot 46.

The packet radio transmitter of the present invention can vary in its working frequency. In one aspect of the present invention, the transmitter preferably works at an operating frequency of about 2.45 GHz. This operating frequency is desirable since it is presently unlicensed, underpopulated and requires only a very small antenna 93 which can be attached directly to the circuit board. Once generated and transmitted, the packet of information contains an address portion 94 and data portion 94a (FIG. 2). The address portion 94 notes a desired address for which the packet receiver 11 is to receive the data. This could include the packet receiver 11 contained adjacent to the entrance to a door as well as other packet receivers located around the office or residence, such as on the desk. The packet receiver 11 includes a circuit board 11b and related circuitry, and a receiving antenna 11c for receiving the packet stream and processing the information for the display.

Figure 4:
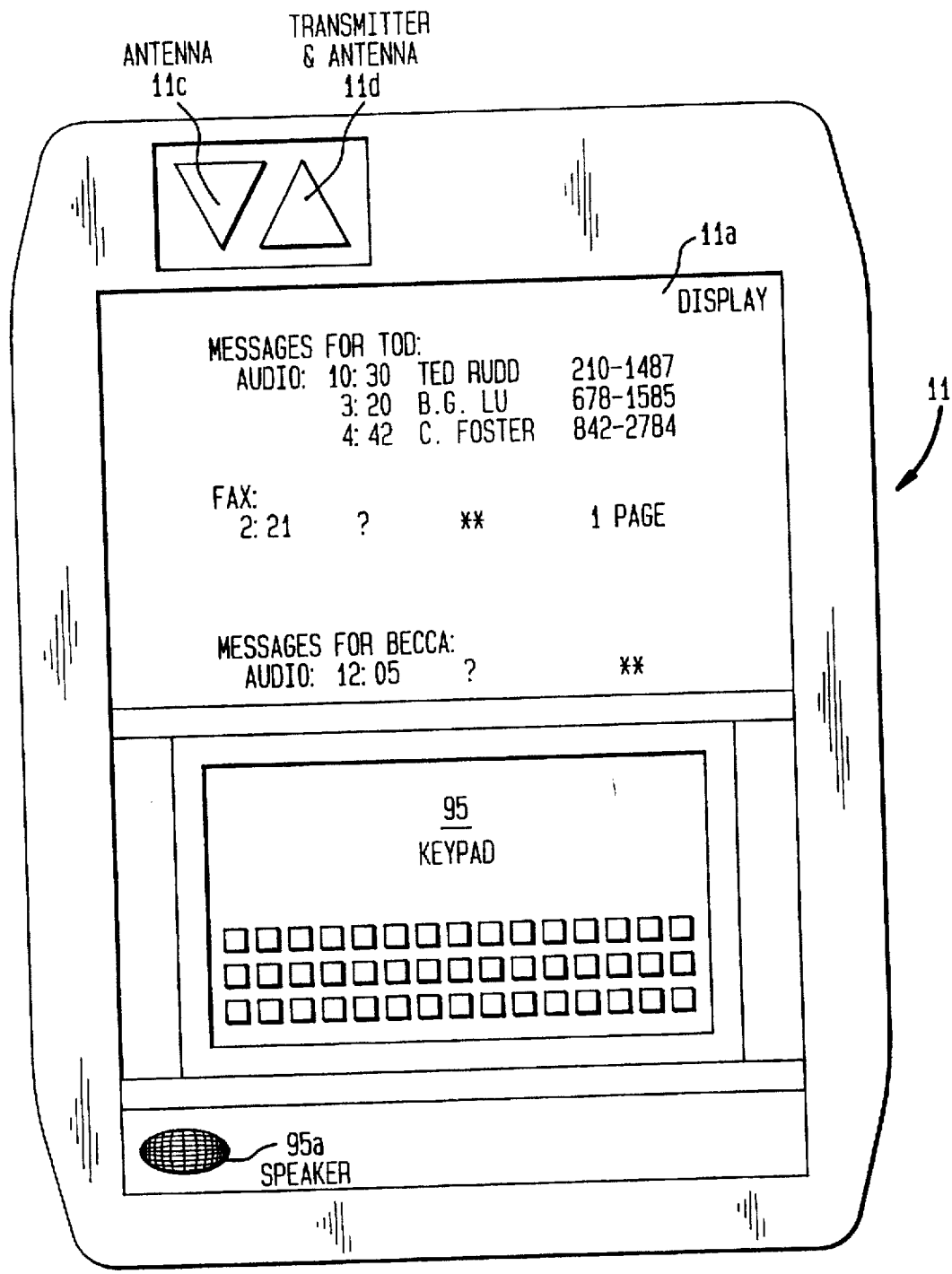
FIG. 4 is a schematic diagram of the display for the packet receiver which can be placed at the entrance to a door or any other desired location.

FIG. 4 illustrates the display 11a of a packet receiver 11 and the type of information which can be displayed on a display screen of the packet receiver 11. The packet receiver display screen 11a can be an LCD or LED depending on where the packet receiver is located. When the packet receiver is located at the entrance to an office or residence, as shown in FIG. 1, an LED screen would be more desirable since it would light the information. If an LCD screen is used, an internal light can light the LCD display at night.

Typical information which can be displayed on the display can include the name of the caller, the telephone number, and the time of the call as well as information concerning faxes and if there are any audio messages. This brief summary would be adequate to enable the harried traveller or residence owner to input information via a packet receiver keypad 95, which can be transmitted to the premises recording unit to begin display of all messages and audio messages or quickly make calls back as necessary. The transmitted messages can be simple, and can be generated by an infrared or packet radio transmitter and antenna 11d that generates signals to a receiving antenna 93a. This generated packet receiver information can also include a signal requesting transmission of audio information for broadcast through the speaker 95a (FIG. 4). The packet receiver 11 can be formed from a plastic housing 96, and be about as large as the palm of a hand. All circuitry is located within the housing 96.

Figure 6:
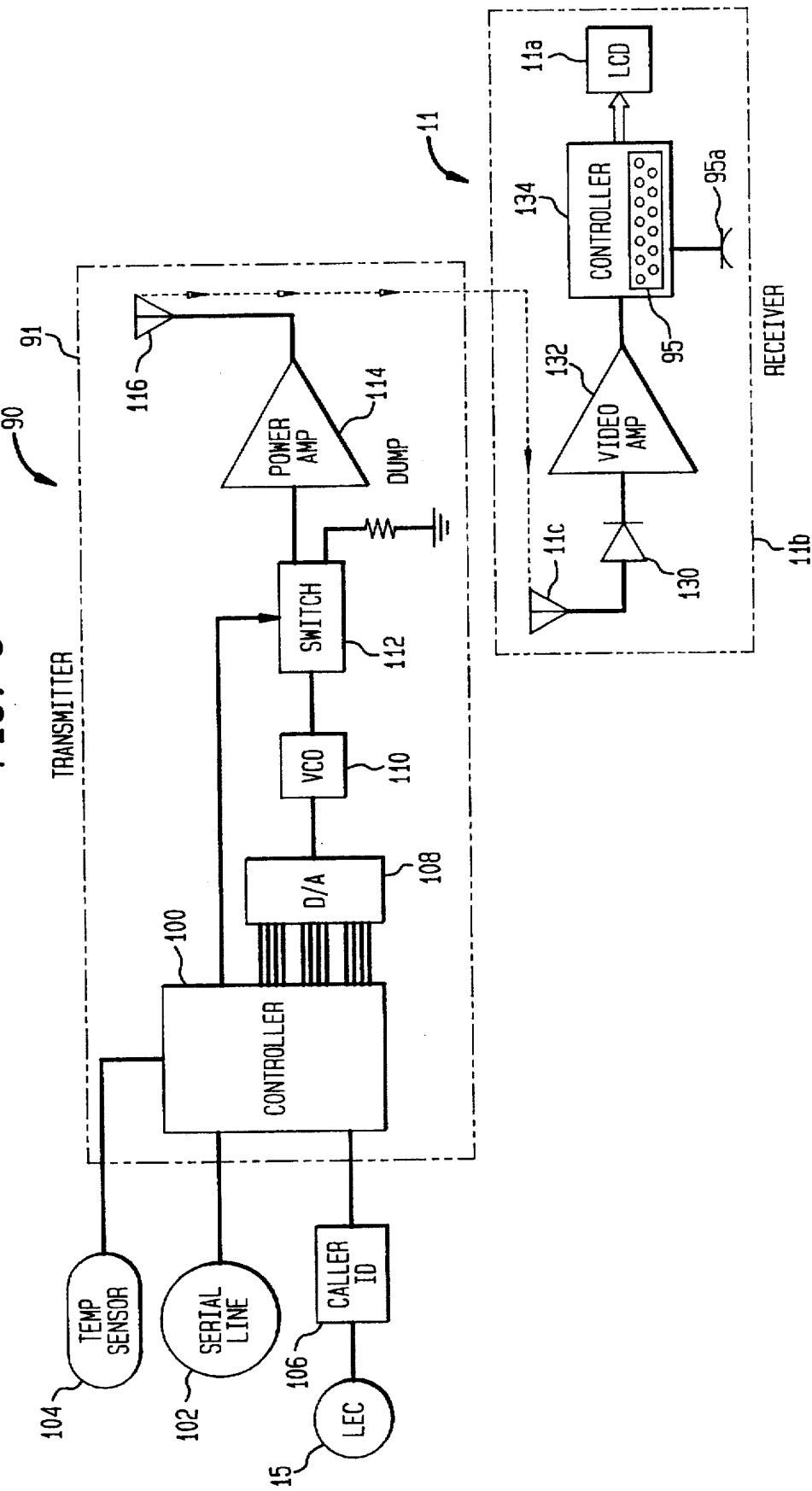
FIG. 6 is a high level block diagram of the transmitter and receiver of the present invention which can be used without a premises recording unit.

Referring now to FIG. 6, there is illustrated the transmitter 90 and receiver 11 of the present invention which in one aspect can be stand-alone units for use without the recording function of a premises recording unit. As shown in FIG. 6, a controller 100 is positioned on a circuit board 91. A serial line 102 is connected into the controller 100 and receives information such as from a modem or other source. In another aspect of the invention, a temperature sensor can also be connected directly into the controller 100. The transmitter 91 then transmits temperature readings to the receiver 11 which are then displayed on the LCD 11a.

When the transmitter 91 is connected to the local exchange carrier 15, caller ID, indicated at block 106, is retrieved. The controller inputs signals directly to a digital to analog (D/A) converter 108 and then to a voltage controlled oscillator (VCO) 110 and then into a switch 112. From the switch the signal is then transmitted to a power amplifier 114 which then amplifies the signal for transmission to the receiver via an antenna 116 positioned on the circuit board 91. Extraneous signals can be dumped via circuit 120.

The transmitted signal is then sent to the receiver 11 and received by receiver antenna 11c positioned on the circuit board 11b. The received signal is then forwarded to a diode detector 130 which rectifies the signal. The signal then is amplified by video amplifier 132 and sent to a controller 134 and displayed on an LCD 11a. It should be understood that the described transmitter 90 and receiver 11 can be part of the premises recording unit or separate subsets and stand-alone units.

Figure 5:
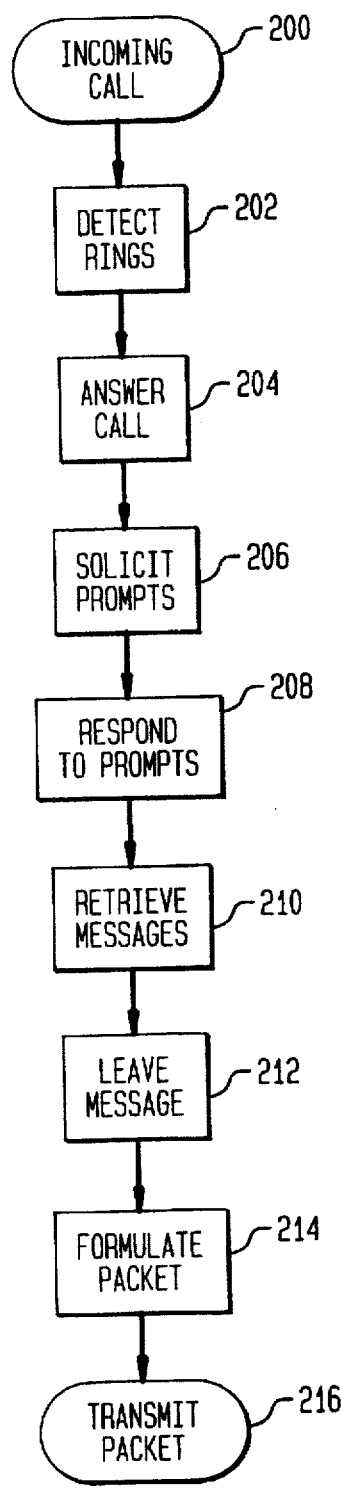
FIG. 5 is a high level flow chart depicting one sequence of possible steps for storing information in and transmitting that information to the packet receiver from the premises recording unit.

The flow chart of FIG. 5 illustrates the various steps of one aspect of the invention. For purposes of understanding the blocks of the flow chart are numbered with numerals starting in the 200 series.

A call comes initially into the premises (block 200). The ring detection circuit 84 detects the number of rings and transmits this information to the microprocessor 32 (block 202). A response to the ring detection circuit, the microprocessor 32 generates instructions to other components so that the call is answered (block 204). A menu is given is given asking for several prompts (block 206). The caller can respond be a selected keypad sequence, such as **T, or any other desired prompts (block 208). The outside caller can retrieve messages if a certain password is entered based on instructed prompts. Selected messages recorded in memory then can be retrieved (block 210). In addition, the network caller can leave a message (block 212).

Basic information such as the caller identification, the caller and the time of the call is then input into a digital sequence and forms part of the data information for a packet (Block 214). The packet then is transmitted by means of the radio transmitter and the address portion of the packet then dictates where and to what packet receiver (Block 216). If there is a fax message or an audio message that also can be displayed.

It is to be understood that the above description is only one preferred embodiment of the invention. Numerous other arrangement may be devised by one skilled in the art without departing from the spirit and scope of the invention.

That which is claimed is:

1. An apparatus for recording and transmitting information received over a telephone network comprising
   premises recording means located within the premises for storing telephone information and messages received from a telephone network,
   means for connecting said premises recording means to the telephone network,
   said premises recording means further including wireless transmission means for generating and transmitting a packet of at least a portion of the telephone information and messages received from the telephone network to a separate packet receiver spaced distant from said premises recording means but within range of a packet of telephone information and messages generated from the premises recording means for receiving and storing said packet of telephone information and messages.

2. The apparatus according to claim 1 wherein said premises recording means includes means for extracting a caller ID from an incoming telephone message and transmitting same to a packet receiver.

3. The apparatus according to claim 1 wherein said premises recording means includes means for interfacing with a video display for displaying the telephone information and messages.

4. The apparatus according to claim 3 wherein said premises recording means includes means responsive to signals received from a wireless premises control unit for retrieving the telephone information and messages and displaying same on the video display.

5. The apparatus according to claim 4 wherein said premises recording means includes infrared sensing means for receiving an infrared control signal from a wireless control unit for enabling control of said premises recording means via an infrared signal generated from a control unit.

6. The apparatus according to claim 1 including means for operatively connecting said premises recording means to a cable set top box.

7. An apparatus for recording and transmitting information received over a telephone network comprising
   premises recording means located within a premises for storing telephone information and messages received from a telephone network,
   means for connecting said premises recording means to the telephone network,
   said premises recording means further including a microprocessor and memory for storing telephone information and messages received from the telephone network,
   a bus operatively connected to said premises recording means,
   at least one cartridge slot interconnected to said bus for receiving cartridges having software for interacting with said microprocessor and memory,
   a cartridge positioned within said cartridge slot, said cartridge including a packet transmitter for generating and transmitting a packet of at least a portion of the telephone information and messages received from the telephone network to a packet receiver spaced distant from said premises recording means but within range of a packet of telephone information and messages generated from the premises recording means for receiving, storing, and displaying at least a portion of the transmitted packet of telephone information and messages.

8. The apparatus according to claim 7 wherein said premises recording means includes means for extracting a caller ID from an incoming telephone message and transmitting same to a packet receiver spaced distant from the premises recording means.

9. The apparatus according to claim 7 wherein said premises recording means includes infrared sensing means for receiving an infrared control signal generated by a control unit for enabling control of said premises recording means via the infrared signal generated from a premises control unit.

10. The apparatus according to claim 7 wherein said premises recording means included means for operatively connecting said premises recording means to a cable set top box.

11. The apparatus according to claim 7 wherein said premises recording means includes means responsive to signals received from a wireless premises control unit for retrieving stored telephone information and messages.

12. An apparatus for recording and transmitting information received over a telephone network comprising
   premises recording means for storing telephone information and messages received from a telephone network,
   means for connecting said premises recording means to the telephone network, said premises recording means further including transmission wireless means for generating and transmitting a packet of at least a portion of the telephone information and messages received the telephone network to a packet receiver spaced distant from said premises recording means but within range of a packet generated from the wireless transmission means for receiving, storing, and displaying a packet of telephone information and messages, said premises recording means further including means for receiving and storing information generated by and from a packet receiver to the premises recording means, wherein said premises recording means is responsive to information received from a packet receiver.

13. The apparatus according to claim 12 wherein said premises recording means includes means for interfacing with a video display for displaying the telephone information and messages.

14. The apparatus according to claim 13 wherein said premises recording means includes means responsive to signals received from a wireless premises control unit for retrieving the telephone information and messages and displaying same on the video display.

15. The apparatus according to claim 12 wherein said premises recording means includes infrared sensing means for receiving infrared control signals generated from a control unit for enabling control of said premises recording means via infrared signals generated from a control unit.

16. The apparatus according to claim 12 including means for operatively connecting the premises recording means to a cable setup box.

* * * * *